US008156983B2

(12) United States Patent
Norrby

(10) Patent No.: US 8,156,983 B2
(45) Date of Patent: Apr. 17, 2012

(54) AUXILIARY MACHINE FOR LABELLING MACHINES

(75) Inventor: Henry Norrby, Järvsö (SE)

(73) Assignee: Tempix AB, Järvsö (SE)

( * ) Notice: Subject to any disclaimer, the term of this patent is extended or adjusted under 35 U.S.C. 154(b) by 402 days.

(21) Appl. No.: 12/085,288

(22) PCT Filed: Dec. 11, 2007

(86) PCT No.: PCT/SE2007/050974
§ 371 (c)(1), (2), (4) Date: May 21, 2008

(87) PCT Pub. No.: WO2008/082349
PCT Pub. Date: Jul. 10, 2008

(65) Prior Publication Data
US 2010/0218900 A1 Sep. 2, 2010

(30) Foreign Application Priority Data
Jan. 3, 2007 (SE) ...................................... 0700013

(51) Int. Cl.

| | |
|---|---|
| ***B29C 65/56*** | (2006.01) |
| ***B32B 37/10*** | (2006.01) |
| ***B32B 37/12*** | (2006.01) |
| ***B32B 37/14*** | (2006.01) |
| ***B32B 37/26*** | (2006.01) |
| ***B32B 38/10*** | (2006.01) |
| ***B65C 9/02*** | (2006.01) |
| ***B65C 9/08*** | (2006.01) |
| ***B65C 9/20*** | (2006.01) |
| ***B65C 9/26*** | (2006.01) |
| ***G05G 15/00*** | (2006.01) |
| *B29C 65/18* | (2006.01) |
| *B65C 9/12* | (2006.01) |
| *B65H 26/06* | (2006.01) |
| *G05G 15/04* | (2006.01) |

(52) U.S. Cl. ........ 156/361; 156/362; 156/538; 156/539; 156/540; 156/541; 156/542; 156/543

(58) Field of Classification Search .................. 156/350, 156/361–363, 538–543
See application file for complete search history.

(56) References Cited

U.S. PATENT DOCUMENTS 2,133,239 A * 10/1938 Arndt ............................ 156/356
3,745,083 A * 7/1973 Aungst et al. ................. 156/388
4,018,028 A * 4/1977 Donnet ............................. 53/51
4,154,107 A 5/1979 Giezen et al.
(Continued)

FOREIGN PATENT DOCUMENTS

CA 2569093 2/2007
(Continued)

*Primary Examiner* — Sonya Mazumdar
(74) *Attorney, Agent, or Firm* — Dilworth & Barrese, LLP.

(57) ABSTRACT

An auxiliary machine for labelling machines of the type including a supply of labels (10) for application on packages (4) for goods and a thermal printer (6) for the provision of informative prints on the labels, is provided. The auxiliary machine has a stand (14) connectable to the labelling machine and on which there is supported a supply of coverings (16), which are detachably attached to a tape (23), a mechanism for advancing the tape (23) to a picking tool (20) for picking off individual coverings from the tape and applying the same on individual labels (10), as well as a dispenser (19) for the discharge of a substance loading on the individual label. Advantageously, in the auxiliary machine, a stamping tool (25) may also be included for stamping of cavities in the coverings or labels.

12 Claims, 2 Drawing Sheets

U.S. PATENT DOCUMENTS

Figure 1:
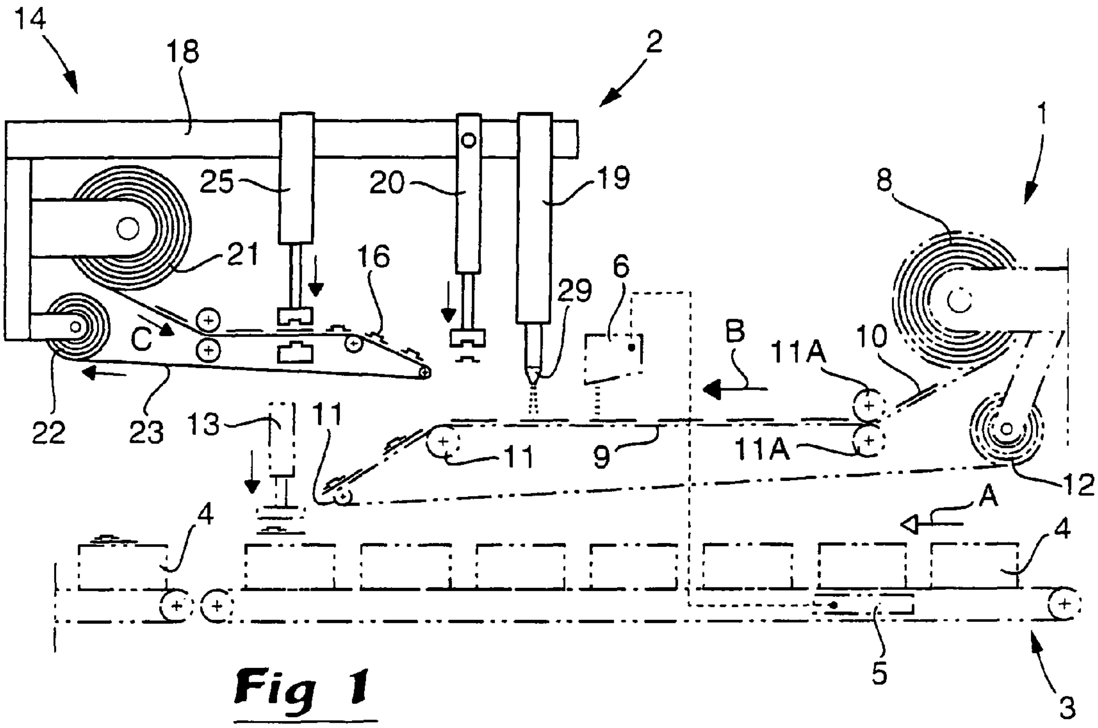

| | | | | |
|---|---|---|---|---|
| 4,657,622 | A * | 4/1987 | Paules | 156/361 |
| 5,667,303 | A * | 9/1997 | Arens et al. | 374/102 |
| 5,682,729 | A * | 11/1997 | Buchko | 53/453 |
| 6,544,925 | B1 * | 4/2003 | Prusik et al. | 503/201 |
| 7,313,894 | B2 * | 1/2008 | Mise et al. | 53/64 |
| 2003/0066601 | A1 * | 4/2003 | Weder et al. | 156/297 |
| 2005/0155713 | A1 * | 7/2005 | Mathea | 156/361 |
| 2005/0219051 | A1 | 10/2005 | Nedblake | |

FOREIGN PATENT DOCUMENTS

| | | | |
|---|---|---|---|
| DE | 19929849 | | 1/2001 |
| DE | 19929849 | A1 * | 1/2001 |
| SE | 528 869 | | 1/2007 |
| WO | 01/64430 | | 9/2001 |
| WO | 03/077227 | | 9/2003 |
| WO | WO 2007008129 | A1 * | 1/2007 |

* cited by examiner

AUXILIARY MACHINE FOR LABELLING MACHINES

BACKGROUND OF THE INVENTION

This invention relates to an auxiliary machine for labelling machines of the type that includes a supply of labels for application on packages for goods as well as a thermal printer for the provision of informative prints on the labels.

PRIOR ART

Labelling machines of the type mentioned above are widely used in packing plants for the preparation of goods and packages for goods prior to commercialization. For instance, such plants may be available at different suppliers of goods to the convenience goods trade, and sometimes also at tradesmen themselves. The predominant technique for the application of the requisite informative print, such as bar-codes and information about price, weight, origin of goods, etc., is carried out by means of a thermal printer in combination with a particular selection of material in the labels. More precisely, the labels are provided with a dye having the ability to produce a print by the effect of heat. Frequently, the thermal printer is electronically connected to a balance that is built-in into a conveyor included in the plant, on which conveyor the individual packages for goods pass the labelling machine after having been processed in a number stations, e.g., for filling, preservation, sealing, etc.

Certain goods, in particular foods, have a limited shelf life and have for this reason to be stored at low temperatures. For instance, quick-frozen foods should be stored below −18° C., while chilled products can be stored at higher temperatures, e.g., up to +4° C. and +8° C., respectively.

In order to obviate the risk that unfresh goods reach the market, recently, techniques to monitor the temperature holding in the refrigerating and freezing chain from the supplier to the customer have been developed, more precisely by making the labels of the packages for goods in such a way that reading of the bar-codes thereof is made impossible if the temperature of the goods during a certain time exceeds the prescribed maximum value. Thus, in SE 0501607-6, there is disclosed a label manufactured from a porous substrate, e.g., paper, having a considerable capillary absorption capacity, the substrate being supplied with a loading of a substance that contains a contrast-destroying agent and is of the type that is solid up to a fixed temperature, but becomes liquid above the same, the substance loading being placed beside the bar-code of the label. In such a way, the code bars remain intact and distinctly readable as long as the highest allowable temperature value is not exceeded. Not until when and if the temperature value is exceeded, and the substance trans-forms into the liquid state, the readability of one or more code bars is destroyed in an irreversible way. Such destruction of the contrast of the code bars to the base colour of the label can be achieved by the fact that the substance contains components that affect the colour of the code bars. For instance, a substance component may be used that activates the previously unutilized dye in the thermal-printable layer that surrounds the individual code bars, in order to, in such a way, colour the substrate around the bars, so that the same are concealed and become unreadable. Alternatively, the substance may contain a component that bleaches the colour of the printed code bars.

In said patent document, there is also disclosed a machine for the application of labels of the kind in question on packages for goods. In said machine, there are included, on one hand, a supply of labels in the form of a tape rolled up onto a reel and to which labels are detachably attached, and on the other hand a mechanism to advance the tape toward a picking tool by means of which the labels can be released from the tape and applied on passing packages for goods. Furthermore, there are included a thermal printer and (as viewed in the feeding direction of the tape) a nozzle placed downstream the same for the application of substance loadings on the individual labels. Between the nozzle and the picking tool, furthermore there is arranged a tool for applying coverings on the substance loadings applied on the labels with the purpose of enclosing said loadings in cavities that communicate with the porous label substrates.

A disadvantage of the above-mentioned machine is, however, that the discharge nozzle for the substance loadings as well as the tool for the application of coverings on the labels are integrated with the other machine components in the form of the label supply, the tape-feed mechanism and the thermal printer. This means that existing, well-functioning labelling machines cannot be used to produce labels having the desired temperature-monitoring function without requiring extensive and expensive reconstructions.

SUMMARY OF THE INVENTION

The present invention aims at obviating the above-mentioned disadvantages of the machine in question and at providing improved conditions to cost-effectively produce goods-package labels having an inherent temperature-monitoring capacity. A primary object of the invention is therefore to provide a structurally simple auxiliary machine, which in an adaptable way can be connected to existing, conventional labelling machines and in cooperation with the same allow the production of inexpensive labels having a good temperature-monitoring capacity.

According to the invention, the above-mentioned object is attained by the features defined herein. Preferred embodiments of the auxiliary machine according to the invention are also defined herein.

BRIEF DESCRIPTION OF THE APPENDED DRAWINGS

Figure 2:
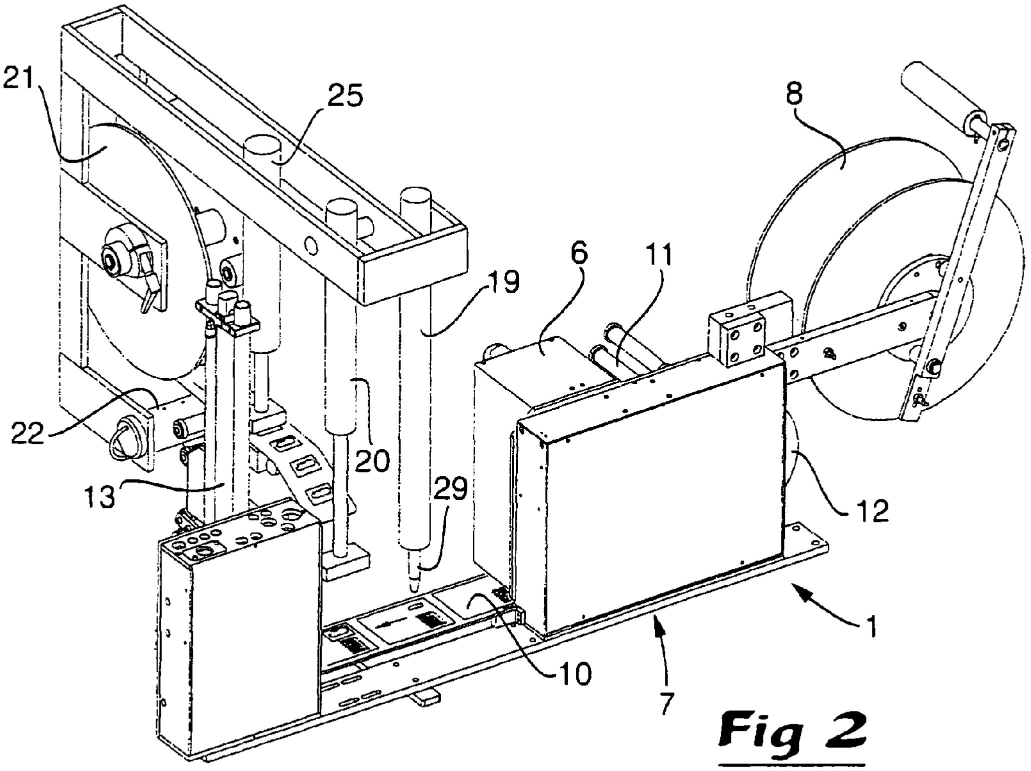
Figure 3:
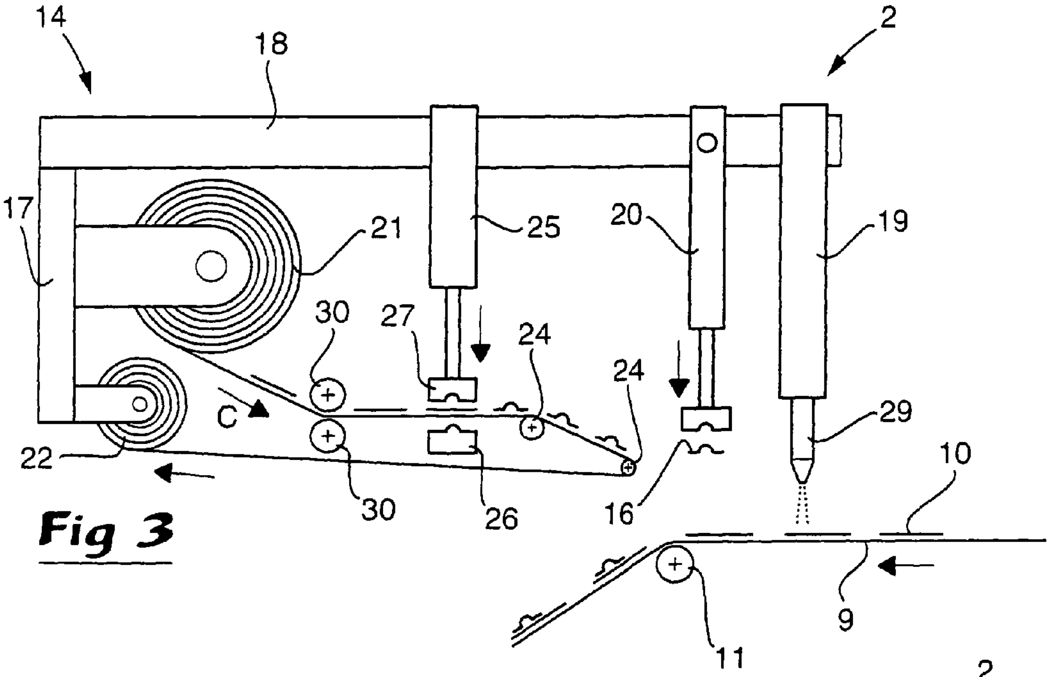
Figure 4:
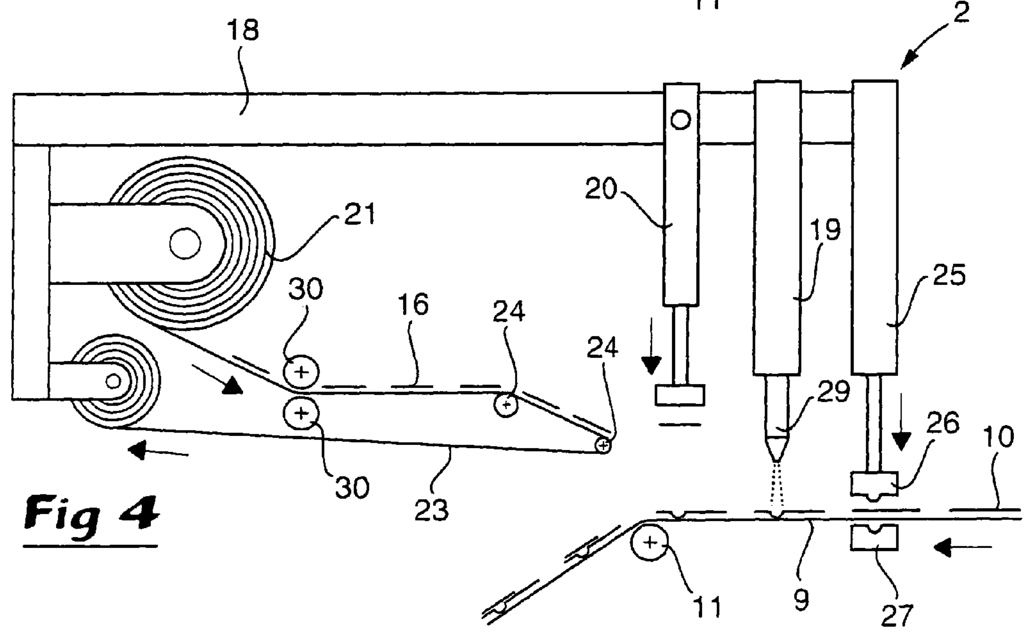
Figure 5:
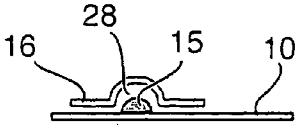
Figure 6:
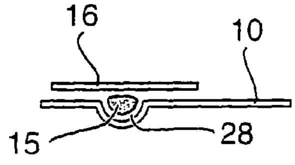

In the drawings:

FIG. 1 is a simplified, schematic side view that illustrates a labelling machine of known type shown with dash-dotted lines, as well as an auxiliary machine according to the invention shown with solid lines, FIG. 2 is a perspective view of the known labelling machine, as well as a second, alternative design of the auxiliary machine according to the invention, FIG. 3 is an enlarged side view of the auxiliary machine according to FIG. 1, FIG. 4 is an analogous side view showing the auxiliary machine in an additional design according to the invention, FIG. 5 is a detailed view showing a first design of a covering for enclosing a substance loading on a label, and FIG. 6 is a detailed view showing another design of the covering.

DETAILED DESCRIPTION OF PREFERRED EMBODIMENTS OF THE INVENTION

In FIGS. 1 and 2, 1 designates generally a labelling machine of previously known type, while 2 designates an auxiliary machine according to the invention. The labelling machine 1 is installed above a conveyor 3, e.g., a belt conveyor, on which packages 4 for goods are advanced in the direction of the arrow A. This conveyor is included in a plant in which the goods in question are prepared for later commercialization. If the goods consist of foods, in the plant, there may be included one or more, stations (not shown) for filling, preservation, and packaging, which are situated upstream the conveyor 3. In the conveyor 3, a balance 5 is built-in, which is electronically connected to a thermal printer 6, such as is outlined by the dashed line in FIG. 1. After the packages for goods have been provided with labels by means of the two machines 1, 2, the packages may be fed further to one or more additional processing stations, e.g., for wrapping up into multi packages.

The different components included in the labelling machine 1 are supported by a stand 7, which generally has an elongate shape. At one end of the stand, there is mounted a reel 8 onto which a tape 9 is rolled up, on which labels 10 are detachably attached. Via a pair of drive rollers 11A as well as a number of deflection rollers 11, the label tape 9 can be fed in the direction of the arrow B toward a return roller 12, which by being drivable assists in feeding the tape. In the rear end of the machine, a picking tool 13 is included, by means of which the labels can be released one by one from the tape 9 and applied on the packages 4 for goods on the conveyor 3 that are passing under the picking tool.

As far as the shown labelling machine 1 has been described hitherto, the same can perform the simple task of providing the labels with prints generated by heat, and apply the printed labels on the packages for goods. Such as mentioned previously, the prints in question may, in addition to a bar-code, include information about the weight, origin, best-before date, etc., of the goods.

The secondary machine or auxiliary machine 2 according to the invention includes a stand, in its entirety designated 14, which supports the different components required to complete the processed labels with a temperature-monitoring function. More precisely, the auxiliary machine 2 includes components to supply the individual label 10 (see FIG. 5) with a loading 15 of a substance having the ability to destroy the contrast of one or more bars in the printed bar-code, as well as with a covering 16 having the purpose of enclosing the applied substance loading.

Reference is now made to FIG. 3, which on an enlarged scale illustrates the embodiment of the auxiliary machine according to the invention shown in FIG. 1. In this case, the stand 14 includes an upright 17 and a jib or boom 18, which at the free end thereof supports a dispenser 19 as well as a picking tool 20. Under the boom 18, two reels are mounted, namely an upper supply reel 21 and a lower, drivable return reel 22 for a tape 23 on which coverings 16 are detachably attached. By means of a pair of drive rollers 30 and the drivable reel 22, the tape 23 can be fed in the direction of the arrow C past a number of deflection rollers 24.

In the shown, preferred design, between the supply reel 21 and the picking tool 20, a stamping tool 25 is arranged for stamping of at least one cavity in the individual covering 16. For this purpose, the tool 25 includes a fixed die 26 having a protruding male member, and a movable stamp 27 having a downwardly open seat into which the male member can be pressed. When an originally plane covering of, for instance, a plastic material having a certain inherent rigidity is stamped by pressing together the stamp and the die, in the covering, there is formed an arched portion that delimits a cavity 28 (see FIG. 5) in which the substance loading 15 is accommodated.

The dispenser 19 includes a nozzle 29 by means of which individual substance loadings 15 can be applied with a good precision to desired spots along the passing labels 10. In the design according to FIG. 3, the picking tool 20 is placed between the dispenser 19 and the stamping tool 25. More precisely, the components 19, 20, 25 are arranged one after the other in a vertical plane, the length extension of which is determined by the boom 18. Accordingly, like the labelling machine 1, the auxiliary machine 2 has also a certain length extension. As is seen in FIG. 1, the machines 1 and 2 are placed aligned with each other, i.e., in a common vertical plane, at the front end of the jib 18, the dispenser 19 and the picking tool 20 being located above the label tape, more precisely downstream the thermal printer 6 and upstream the picking tool 13 as viewed in the feeding direction B of the label tape.

The described auxiliary machine operates in the following way. When the individual label 10, after having been supplied with a print (among other things a bar-code or other coded information) by means of the thermal printer 6, passes the dispenser 19, a substance loading 15 is applied to the same via the precision nozzle 29. Simultaneously, coverings 16 are completed by initially plane coverings being fed out from the supply reel 21 and stamped in the way described by means of the tool 25. From the tape 23, the individual covering 16 is released by means of the picking tool 20, which, by being movable in the area between the two tapes 9, 23, can transfer the covering to the passing label having been supplied with the substance loading. By means of the picking tool 20, the covering is fixedly pressed onto the label while enclosing the substance loading. Finally, the picking tool 13 removes the prepared label from the tape 9 and transfers the same to the individual package 4 for goods that passes along the conveyor 3. It is worth mentioning that one and the same adhesive that detachably adheres the labels 10 to the tape 9 and the coverings 16 to the tape 23, respectively, is utilized for the application of, on one hand, the labels on the packages 4 for goods, and on the other hand the coverings 16 on the labels 10. The feed of the two tapes may advantageously take place intermittently in motion patterns that are synchronized not only mutually, but also with the conveyor 3.

In the alternative design according to FIG. 2, the auxiliary machine 2 is mounted beside the labelling machine 1, more precisely perpendicular to the same. A stamping tool 25 and a picking tool 20 are also in this case arranged in a common vertical plane along a boom 18. On the other hand, the dispenser 19 is situated beside said vertical plane to apply the individual substance loading to the intended label before the picking tool 20 applies a covering on the same. In other words, the dispenser 19 is still located upstream the picking tool as viewed in the feeding direction of the label tape, in spite of the auxiliary machine being angled in relation to the main machine.

Reference is now made to FIG. 4, which illustrates an additional alternative design of the auxiliary machine according to the invention. In this case, a stamping tool 25 is mounted at the front end of the auxiliary machine, i.e., at the free end of the boom 18, the dispenser 19 being placed between the stamping tool 25 and a rear picking tool 20. In this case, the stamping tool 25 has the purpose of forming a cavity 28 in the label 10 instead of in the covering 16. In other words, in this case the covering 16 can retain the plane, simple shape thereof because the substance loading 15 can be housed in the cavity of the label. In this connection, it should be pointed out that the volume of the substance loading in practice may be extremely small, e.g., on the order of 1-25 μl.

A fundamental advantage of the auxiliary machine according to the invention is that the same, in a simple and adaptable way, can be connected to existing labelling machines regardless the concrete design and placement thereof. By means of the auxiliary machine, therefore conventional labels can be cost-effectively completed with a temperature-monitoring function.

Feasible Modifications of the Invention

The invention is not limited only to the embodiments described above and shown in the drawings. Thus, it is feasible to provide the cavities in the coverings and/or the labels requisite for the substance loadings in another way than by means of the stamping tool shown in the drawings. In addition, in each covering and label, respectively, it is feasible to form two or more cavities for a plurality of substance loadings. Furthermore, the stand of the auxiliary machine may be formed in other ways than the one described above.

The invention claimed is:

1. Auxiliary machine (2) for a labelling machine (1) including a supply (8) of labels (10) for application on packages (4) for goods and a thermal printer (6) for printing informative prints on the labels (10), wherein the auxiliary machine (2) comprises a stand (14) connectable to the labelling machine (1), a supply of coverings (16) supported on the stand (14) and detachably attached to a tape (23), a mechanism (30, 24, 22) supported on the stand (14) and configured for advancing the tape (23), a reciprocating picking tool (20) supported on the stand (14) and positioned for picking off and lifting individual coverings (16) from the tape (23) advanced by the mechanism (30, 24, 22) and transferring, lowering and applying the coverings (16) onto individual labels (10) supplied by the labelling machine (1), and a dispenser (19) supported on the stand (14) and positioned for discharging a substance loading (15) on the individual labels (10) supplied by the labelling machine (1).

2. Auxiliary machine according to claim 1, comprising a stamping tool (25) for the formation of a cavity (28) in an individual covering (16) or the individual label (10).

3. Auxiliary machine according to claim 2, wherein the stamping tool (25) is placed upstream the picking tool (20) as viewed in feeding direction (C) of the tape (23) to form a cavity (28) in the individual covering (16) before being applied on a label (10).

4. Auxiliary machine for labelling machines of the type that includes a supply of labels (10) for application on packages for goods, as well as a thermal printer (6) for the provision of informative prints on the labels, wherein the auxiliary machine (2) comprises a stand (14) that is connectable to the labelling machine (1) and on which there is supported a supply of coverings (16), which are detachably attached to a tape (23), a mechanism (30, 24, 22) for advancing the tape (23) to a picking tool (20) having the purpose of picking off individual coverings from the tape (23) and applying the individual coverings (16) on individual labels (10), a dispenser (19) for the discharge of a substance loading (15) on an individual label (10), and a stamping tool (25) for the formation of a cavity (28) in an individual covering (16) or the individual label (10), and the stamping tool (25) is placed downstream the picking tool (20) and the dispenser (19) as viewed in feeding direction (C) of the covering-carrying tape (23) to form a cavity (28) in the individual label (10) before the dispenser (19) applies a substance loading to the same.

5. Auxiliary machine according to claim 2, wherein the stamping tool (25) and the picking tool (20) are arranged above the tape (23) in a common vertical plane, while the dispenser (19) is located beside said vertical plane to apply the substance loading (15) to the individual label (10) before the picking tool applies an individual covering (16) on the label.

6. Auxiliary machine according to claim 1, wherein the stand (14) includes an upright (17) having a protruding boom (18) in which the picking tool (20) and the dispenser (19) are fixed, and a supply reel (21) for the tape (23), as well as a feed reel (22) for the tape are arranged on the upright (17) and under the boom (18).

7. Auxiliary machine according to claim 3, wherein the stamping tool (25) and the picking tool (20) are arranged above the tape (23) in a common vertical plane, while the dispenser (19) is located beside said vertical plane to apply the substance loading (15) to the individual label (10) before the picking tool applies an individual covering (16) on the label.

8. Auxiliary machine according to claim 2, wherein the stand (14) includes an upright (17) having a protruding boom (18) in which the picking tool (20) and the dispenser (19) are fixed, and a supply reel (21) for the tape (23), as well as a feed reel (22) for the tape are arranged on the upright (17) and under the boom (18).

9. Auxiliary machine according to claim 3, wherein the stand (14) includes an upright (17) having a protruding boom (18) in which the picking tool (20) and the dispenser (19) are fixed, and a supply reel (21) for the tape (23), as well as a feed reel (22) for the tape are arranged on the upright (17) and under the boom (18).

10. Auxiliary machine according to claim 4, wherein the stand (14) includes an upright (17) having a protruding boom (18) in which the picking tool (20) and the dispenser (19) are fixed, and a supply reel (21) for the tape (23), as well as a feed reel (22) for the tape are arranged on the upright (17) and under the boom (18).

11. Auxiliary machine according to claim 5, wherein the stand (14) includes an upright (7) having a protruding boom (18) in which the picking tool (20) and the dispenser (19) are fixed, and a supply reel (21) for the tape (23), as well as a feed reel (22) for the tape are arranged on the upright (17) and under the boom (18).

12. Auxiliary machine according to claim 7, wherein the stand (14) includes an upright (17) having a protruding boom (18) in which the picking tool (20) and the dispenser (19) are fixed, and a supply reel (21) for the tape (23), as well as a feed reel (22) for the tape are arranged on the upright (17) and under the boom (18).

* * * * *